US011447132B2

(12) United States Patent
Simmons et al.

(10) Patent No.: US 11,447,132 B2
(45) Date of Patent: Sep. 20, 2022

(54) TRAILER HITCHING ASSISTANCE SYSTEM WITH DYNAMIC VEHICLE CONTROL PROCESSING

(71) Applicant: Ford Global Technologies, LLC, Dearborn, MI (US)

(72) Inventors: Kyle Simmons, New Boston, MI (US); Luke Niewiadomski, Dearborn, MI (US); Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 16/795,647

(22) Filed: Feb. 20, 2020

(65) Prior Publication Data

US 2021/0261131 A1    Aug. 26, 2021

(51) Int. Cl.
| | |
|---|---|
| *B60W 30/18* | (2012.01) |
| *B60W 10/04* | (2006.01) |
| *B60W 10/18* | (2012.01) |
| *B60W 10/20* | (2006.01) |
| *B60W 50/04* | (2006.01) |
| *B60W 50/00* | (2006.01) |

(52) U.S. Cl.
CPC ...... *B60W 30/18036* (2013.01); *B60W 10/04* (2013.01); *B60W 10/18* (2013.01); *B60W 10/20* (2013.01); *B60W 50/045* (2013.01); *B60W 2050/0052* (2013.01); *B60W 2710/18* (2013.01); *B60W 2710/20* (2013.01); *B60W 2720/106* (2013.01)

(58) Field of Classification Search
CPC ........... B60W 30/18036; B60W 10/04; B60W 10/18; B60W 10/20; B60W 50/045; B60W 2050/0052; B60W 2710/18; B60W 2710/20; B60W 2720/106; B60W 2300/14; B60W 2420/42
USPC .......................................................... 701/41
See application file for complete search history.

(56) References Cited

U.S. PATENT DOCUMENTS

| | | | |
|---|---|---|---|
| 3,519,805 A | 7/1970 | Throne-Booth | |
| 3,921,946 A | 11/1975 | Norton et al. | |
| | (Continued) | | |

FOREIGN PATENT DOCUMENTS

| | | |
|---|---|---|
| CA | 2739989 | 12/2016 |
| DE | 102005043470 A1 | 3/2007 |
| | (Continued) | |

*Primary Examiner* — Jonathan M Dager
*Assistant Examiner* — Jean W Charleston
(74) *Attorney, Agent, or Firm* — Gregory P. Brown; Price Heneveld LLP

(57) ABSTRACT

A system for assisting in aligning a vehicle for hitching with a trailer includes a controller that receives scene data from a detection system and identifies the trailer within the area to the rear of the vehicle, derives a backing path to align a hitch ball mounted on the vehicle to a coupler of the trailer, and derives a steering control signal, a powertrain control signal, and a brake control signal to respectively control a vehicle steering system, a vehicle powertrain control system, and a vehicle brake system to maneuver the vehicle, including reversing along the backing path. The controller processes at least one of the steering control signal, powertrain control signal, and brake signal according to one of a distance to the coupler, derived from the scene data, or a vehicle speed, obtained from the vehicle speed sensor.

20 Claims, 12 Drawing Sheets

(56) References Cited

U.S. PATENT DOCUMENTS

| | | |
|---|---|---|
| 4,578,754 A | 3/1986 | Sahasrabudhe et al. |
| 5,018,689 A | 5/1991 | Yasunobu et al. |
| 5,586,814 A | 12/1996 | Steiner |
| 6,056,374 A | 5/2000 | Hiwatashi |
| 6,138,063 A | 10/2000 | Himeda |
| 6,409,288 B2 | 6/2002 | Yoshida et al. |
| 6,577,334 B1 | 6/2003 | Kawai et al. |
| 7,263,419 B2 | 8/2007 | Wheals et al. |
| 7,739,015 B2 | 6/2010 | Senneff et al. |
| 8,108,116 B2 | 1/2012 | Mori et al. |
| 8,886,400 B2 | 11/2014 | Kossira et al. |
| 9,140,553 B2 | 9/2015 | Grimm et al. |
| 9,315,212 B1 | 4/2016 | Kyrtsos et al. |
| 9,716,565 B2 | 7/2017 | Mandeville-Clarke et al. |
| 9,854,209 B2 | 12/2017 | Aich et al. |
| 9,889,714 B2 | 2/2018 | Bochenek et al. |
| 2007/0208482 A1 | 9/2007 | Thiede et al. |
| 2009/0326775 A1 | 12/2009 | Nishida |
| 2012/0283909 A1 | 11/2012 | Dix |
| 2015/0203117 A1 | 7/2015 | Kelly et al. |
| 2015/0217767 A1 | 8/2015 | Kelly et al. |
| 2016/0052548 A1* | 2/2016 | Singh .................. B62D 15/028 701/41 |
| 2016/0185350 A1 | 6/2016 | Kelly |
| 2016/0257341 A1* | 9/2016 | Lavoie ............ B60W 30/18036 |
| 2016/0280267 A1* | 9/2016 | Lavoie ................ B62D 5/0409 |
| 2016/0288786 A1* | 10/2016 | Lavoie ..................... B60T 8/32 |
| 2017/0008560 A1* | 1/2017 | Kyrtsos ................. B60W 10/20 |
| 2017/0106869 A1* | 4/2017 | Lavoie ..................... B60T 7/20 |
| 2017/0123431 A1* | 5/2017 | Ghneim .................. G06V 20/56 |
| 2017/0364070 A1 | 12/2017 | Oba |
| 2018/0215382 A1* | 8/2018 | Gupta .................... G08G 1/166 |
| 2019/0009815 A1* | 1/2019 | Lavoie ................. B62D 13/06 |

FOREIGN PATENT DOCUMENTS

| | | |
|---|---|---|
| EP | 2682329 A1 | 1/2014 |
| JP | 4434179 B2 | 1/2010 |
| JP | 2012148699 A | 8/2012 |

\* cited by examiner

TRAILER HITCHING ASSISTANCE SYSTEM WITH DYNAMIC VEHICLE CONTROL PROCESSING

FIELD OF THE INVENTION

The present invention generally relates to a vehicle hitch assistance system. In particular, the system processes various vehicle control signals to improve system performance in backing the vehicle toward a trailer.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer includes a vehicle steering system, a vehicle powertrain control system, a vehicle brake system, a vehicle speed sensor, and a detection system outputting a signal including scene data of an area to a rear of the vehicle. The system also includes a controller that receives the scene data and identifies the trailer within the area to the rear of the vehicle, derives a backing path to align a hitch ball mounted on the vehicle to a coupler of the trailer, and derives a steering control signal, a powertrain control signal, and a brake control signal to respectively control the vehicle steering system, the vehicle powertrain control system, and the vehicle brake system to maneuver the vehicle, including reversing along the backing path. The controller processes at least one of the steering control signal, powertrain control signal, and brake signal according to one of a distance to the coupler, derived from the scene data, or a vehicle speed, obtained from the vehicle speed sensor.

Embodiments of the first aspect of the invention can include any one or a combination of the following features:

the controller processes the steering control signal by applying a rate limit to the steering signal, the rate limit varying with at least one of the distance to the coupler or the vehicle speed;

the controller determines the rate limit by deriving a first rate limit based on the vehicle speed, deriving a second rate limit based on the distance to the coupler, deriving a third rate limit based on an expected steering control signal based on the path, and selecting a lowest rate limit among the first rate limit, the second rate limit, and the third rate limit;

the controller determines the rate limit by selecting the lowest rate limit among the first rate limit, the second rate limit, and the third rate limit when the vehicle is determined to be moving and applies a preset maximum rate when the vehicle is determined to be at a standstill;

the controller processes the steering control signal by applying the rate limit to the steering signal such that the rate limit varies with the distance to the coupler by increasing the rate limit with a decreasing distance to the coupler;

the controller processes the steering control signal by applying the rate limit to the steering signal such that the rate limit varies with the vehicle speed by decreasing the rate limit with a decreasing vehicle speed;

the controller processes the at least one of the steering control signal, powertrain control signal, and brake control signal by applying a filter to the at least one of the steering signal, powertrain control signal, and brake control signal, the filter being applied with a gain that decreases with a decreasing distance to the coupler;

the controller processes the steering control signal by monitoring a current steered wheel position for a change in response to the steering control signal and determining a steering fault based on the current steered wheel position remaining stationary and the steering control signal corresponding with steered wheel movement for a predetermined time interval, stops maneuvering the vehicle when a steering fault is determined during movement of the vehicle, and ignores the steering fault when the vehicle is at a standstill;

the controller processes the scene data to determine a position of the coupler relative to the vehicle on an ongoing basis while reversing along the backing path, at least within a predetermined distance of the trailer, continuously derives the backing path based on the determined position of the coupler, continuously derives the steering control signal, a powertrain control signal, and a brake signal to maintain the vehicle along the backing path, and processes the at least one of the steering control signal, powertrain control signal, and brake control signal to reduce abrupt changes in the vehicle speed or a position of the steering wheel based on a change in the determined position of the coupler.

According to another aspect of the present disclosure, a system for assisting in aligning a vehicle for hitching with a trailer includes a vehicle steering system, a vehicle brake system, a vehicle speed sensor, and a detection system outputting a signal including scene data of an area to a rear of the vehicle. The system also includes a controller that receives the scene data and identifies the trailer within the area to the rear of the vehicle, derives a backing path to align a hitch ball mounted on the vehicle to a coupler of the trailer, and derives a steering control signal to control the vehicle steering system to maneuver the vehicle, including reversing along the backing path. The controller applies a rate limit to the steering signal. The rate limit varies with at least one of a distance to the coupler derived from the scene data or a vehicle speed obtained from the vehicle speed sensor.

According to another aspect of the present disclosure, a system for assisting in aligning a vehicle for hitching with a trailer includes a vehicle steering system, a vehicle powertrain control system, a vehicle brake system, and a detection system outputting a signal including scene data of an area to a rear of the vehicle. The system also includes a controller that receives the scene data and identifies the trailer within the area to the rear of the vehicle, derives a backing path to align a hitch ball mounted on the vehicle to a coupler of the trailer, and derives a steering control signal, a powertrain control signal, and a brake control signal to respectively control the vehicle steering system, the vehicle powertrain control system, and the vehicle brake system to maneuver the vehicle, including reversing along the backing path. The controller applies a filter to at least one of the steering signal, powertrain control signal, and brake control signal. The filter varies according to a distance to the coupler derived from the scene data.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
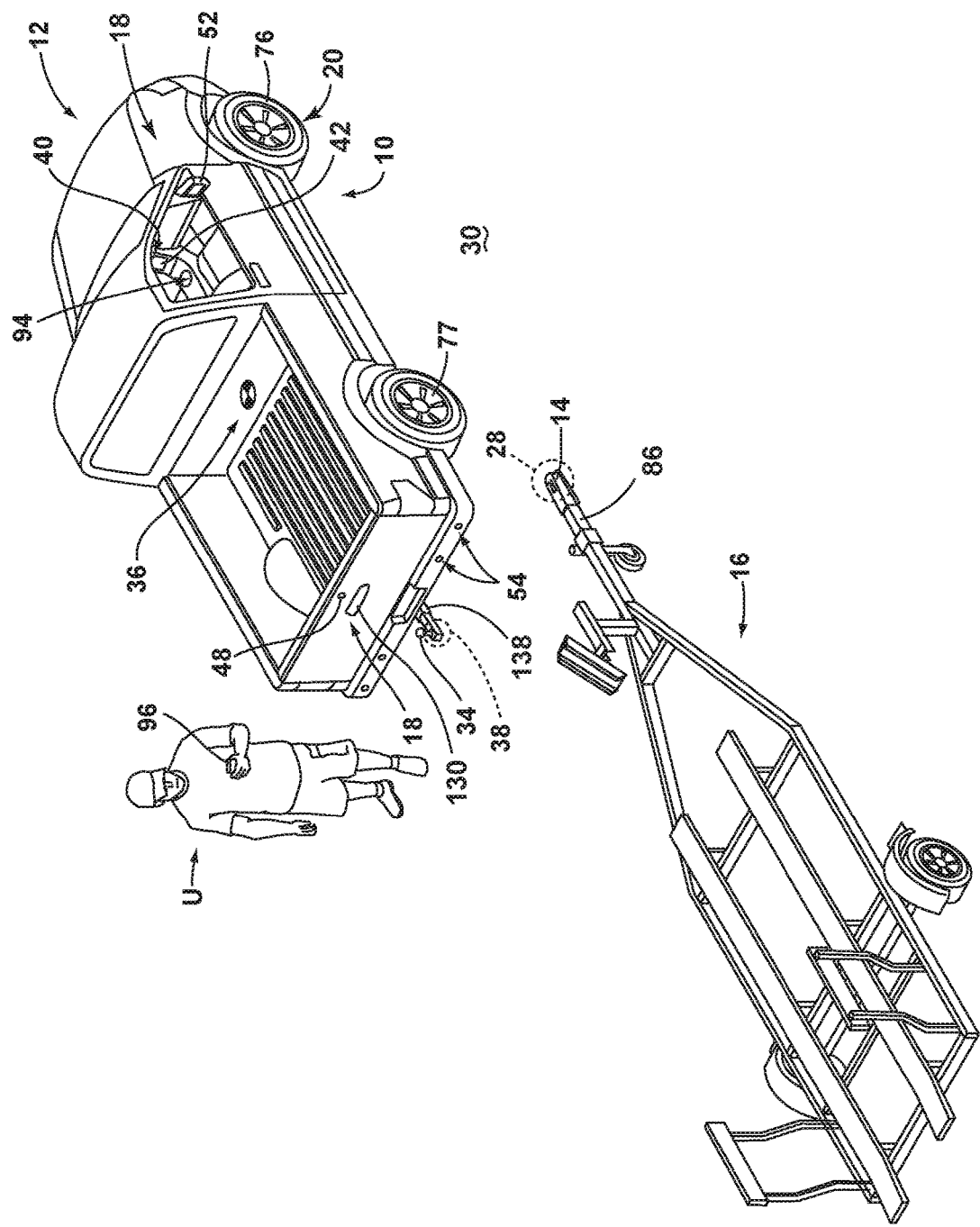
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes a vehicle powertrain control system 72, a vehicle brake system 70, a vehicle speed sensor 56, and a detection system 94 outputting a signal 55 and/or 100 including scene data of an area to a rear of the vehicle 12. The system 10 also includes a controller 26 that receives the scene data and identifies the trailer 16 within the area to the rear of the vehicle 12, derives a backing path 32 to align a hitch ball 34 mounted on the vehicle 12 to a coupler 14 of the trailer 16, and derives a steering control signal 120, a powertrain control signal 172, and a brake control signal 170 to respectively control the vehicle steering system 20, the vehicle powertrain control system 72, and the vehicle brake system 70 to maneuver the vehicle 12, including reversing along the backing path 32. The controller 26 processes at least one of the steering control signal 120, powertrain control signal 172, and brake control signal 170 according to one of a distance $D_c$ to the coupler 14, derived from the scene data, or a vehicle speed, obtained from the vehicle speed sensor 56.

Figure 2:
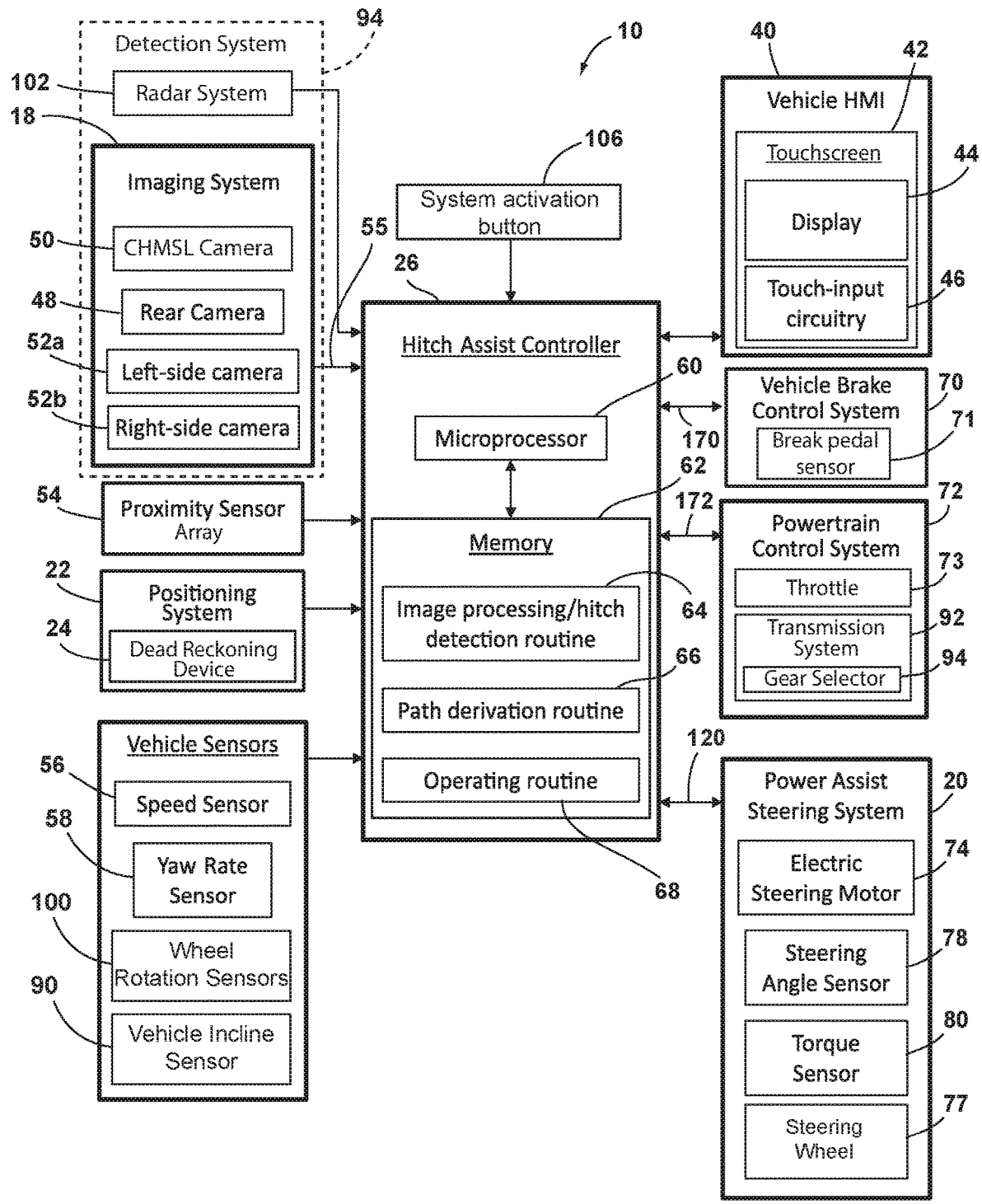
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 120 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
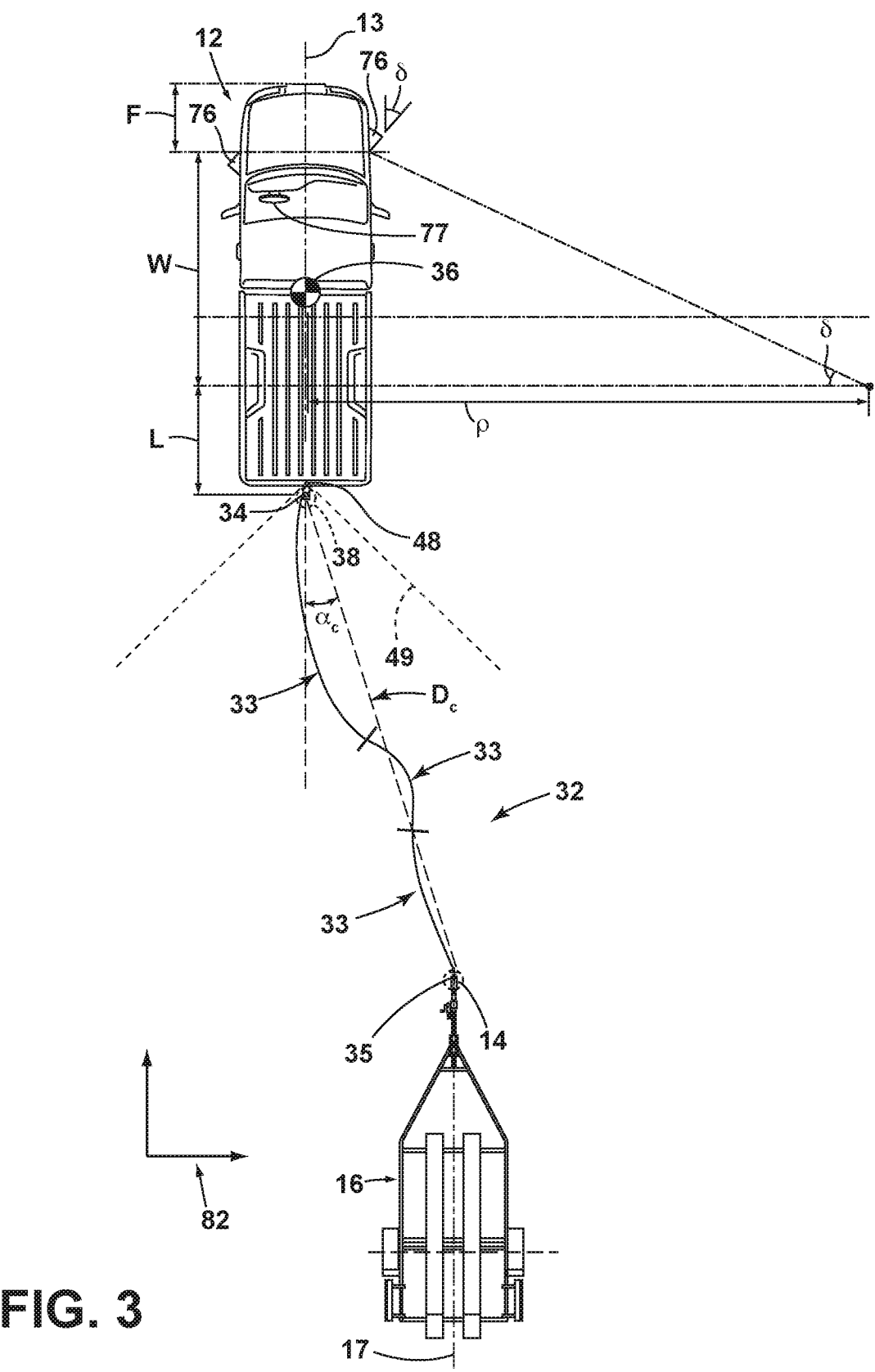
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate $\dot{\gamma}$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16.

For example, the hitch assist system 10, in some embodiments, may regulate speed of the vehicle 12 during alignment of the vehicle 12 with the coupler 14 of trailer 16, and can bring vehicle 12 to a complete stop at a determined endpoint 35 of path 32. The powertrain control system 72, as shown in the embodiment illustrated in FIG. 2, may also interact with the hitch assist system 10 for regulating speed and acceleration of the vehicle 12 during partial or autonomous alignment with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an onboard computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis 13 of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without unintended contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $α_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $δ_{max}$. As shown, the wheelbase W and the current steering angle δ can be used to determine a corresponding turning radius ρ for vehicle 12 according to the equation:

$$\rho = \frac{W}{\tan\delta}, \tag{1}$$

in which the wheelbase W is fixed and the steering angle δ can be controlled by controller 26 by communication with steering system 20, as discussed above. In this manner, when the maximum steering angle $δ_{max}$ is known, the smallest possible value for the turning radius $ρ_{min}$ is determined as:

$$\rho_{min} = \frac{W}{\tan\delta_{max}}. \tag{2}$$

Path derivation routine 66 can be programmed to derive vehicle path 32 to align a known location of the vehicle hitch ball 34 with the estimated position 28 of coupler 14 that takes into account the determined minimum turning radius $ρ_{min}$, to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $α_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
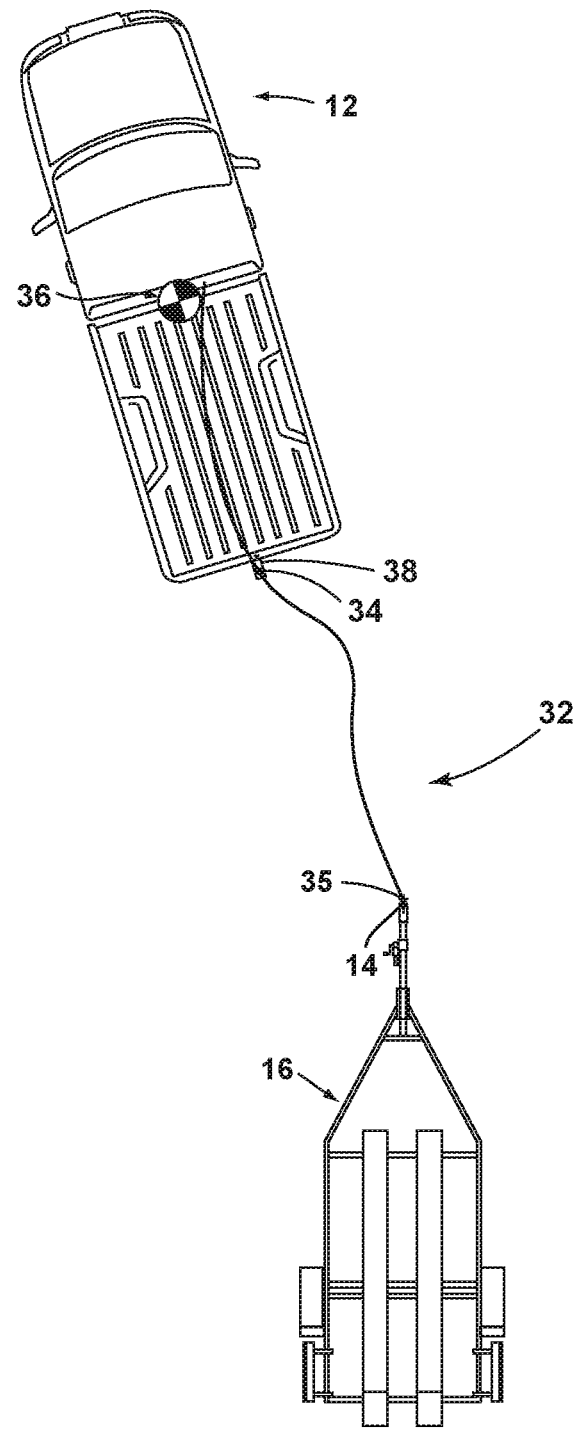
FIG. 4 is an overhead schematic view of the vehicle during a subsequent step of the alignment sequence with the trailer.
Figure 5:
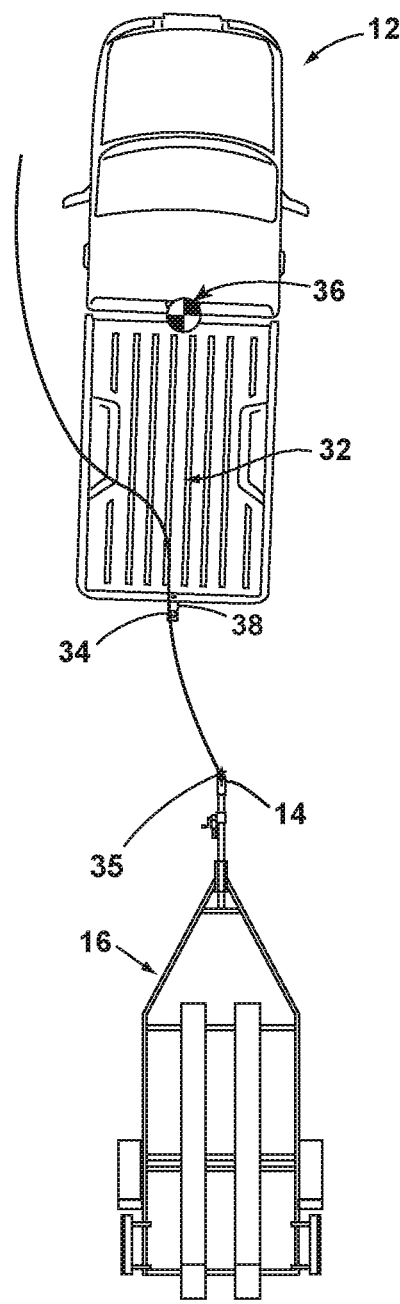
FIG. 5 is an overhead schematic view of the vehicle during a subsequent step of the alignment sequence with the trailer.
Figure 6:
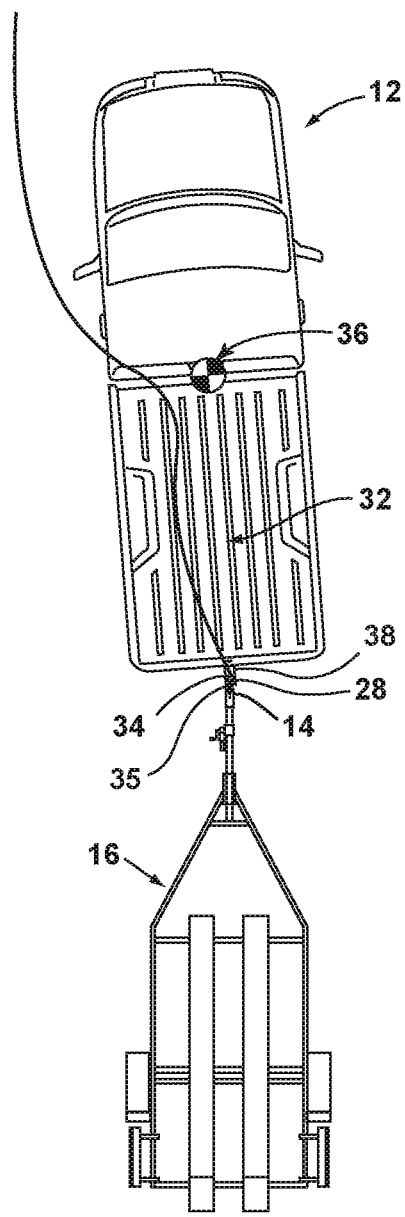
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $α_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $α_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $δ_{max}$, while tracking the position $D_c$, $α_c$ of coupler 14 to converge the known relative position of hitch ball 34 to the desired position 38d thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle brake control system 72, as well as the general processing speed of controller 26 of other components of system 10. In one example, image processing routine 64 may require a minimum travel distance for calibration thereof, including to accurately identify coupler 14 and to assist in tracking of vehicle 12 movement. As discussed further below, the particular minimum distance can be estimated for a given implementation of system 10, based on known values or estimates for such factors. In general, because of the minimum travel distance requirement, if vehicle 12 is at a standstill with insufficient longitudinal distance remaining between hitch ball 34 and coupler 14, the system 10 is programmed to either not initiate operating routine 68 or, if already started, abort operating routine 68 to avoid overshooting the final target position such that hitch ball 34 moves past endpoint 35. In various examples, vehicle 12 may be brought to a standstill for reasons other than operating routine 68 causing the application of the vehicle brakes 70. In particular, vehicle 12 may come to a standstill before reaching the desired final target position due to uneven terrain acting on the vehicle wheels 76 or 77, or by the vehicle brakes 70 being manually applied by the driver. Because such events can cause a vehicle 12 standstill at any point along path 32, the present system 10 provides the ability to detect such a standstill event and to address it appropriately given the capabilities and requirements of system 10. In various examples, system 10 can address an early standstill by aborting, pausing, or automatically rectifying the standstill condition.

As mentioned above, the "longitudinal control" in an assisted hitching maneuver is the portion of vehicle 12 movement along path 32 controlled by the vehicle powertrain control system 72 and the vehicle brake system 70 with the "lateral control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the lateral control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. Using this combination of controls system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center). Controller 26 can receive feedback data during vehicle 12 movement regarding measured vehicle speed and localization (by way of speed sensor 56 and positioning system 22, respectively) such that controller 26 can apply brake pressure and reduce engine speed to bring the vehicle 12 to a standstill at the final target position with hitch ball 34 at endpoint 35.

During system 10 operation, controller 26 processes the scene data (image data 55 and, optionally, radar data 100) to determine the position $D_c$, $α_c$ (FIG. 3) of the coupler 14 relative to the vehicle 12 on an ongoing basis while reversing along the backing path 32. This is done at least within a predetermined distance $D_c$ of the trailer, as in some implementations, controller 26 initially tracks trailer 16 alone until reaching a distance where the coupler 14 can be specifically identified. During system 10 tracking of the coupler 14 while reversing along path 32, the controller 26 continuously derives and/or updates the backing path 32 based on the determined position $D_c$, $α_c$ of the coupler 14 relative to the vehicle 12. As can be appreciated, based on the discussion above, controller 26 continuously derives a steering control signal 120 (FIG. 2) to adjust the angle δ of the steered wheels 76 (the above-described lateral control) to maintain the vehicle 12 on the path while similarly continuously deriving a powertrain control signal 172 and a brake control signal 170 (the longitudinal control) to move vehicle along the backing path 32, while effecting the lateral movement and brining vehicle 12 to a stop at the desired position for alignment of hitch ball 34 with coupler 14. Because the coupler is derived using image processing routine 64, the particular location within the image data 55 identified as the coupler 14 location 28 can vary with changes in the position of camera 48 with respect to trailer 16 (due to movement of vehicle 12), as well as changes in the environment (ambient light, debris, etc.) and general signal noise in image data 55. Further, the identification of coupler 14 in image data 55 becomes more accurate at close distances, and image processing routine 64 may be configured to permit a level of uncertainty in coupler 14 identification at larger perceived distances $D_c$. Any or all of these factors can result in the identified and tracked coupler 14 location 28, upon which the path 32 and, accordingly, steering, powertrain, and brake control signals 120,172, and 170 are based, changing during backing of vehicle 12 along path 32. In this respect, changes in the tracked coupler location 28 can, under certain conditions, be relatively large.

In one example, a portion of the trailer 16, such as a corner or other feature may initially be designated incorrectly as the coupler 14 with a known likelihood of error (as determined by image processing routine 64) determined to be acceptable for system 10 operation at the determined distance $D_c$. As the controller 26 causes the vehicle 12 to reverse toward the incorrect coupler location 28 along an acceptable, yet ultimately incorrect, path 32, the image data 55 can become clearer such that, at a certain distance, the correct coupler 14 is identified with path 32 updating to align endpoint 35 with the correct coupler location 28. As the steering command 120 is being continuously derived, the abrupt change in the path 32 can lead to an abrupt change in the steering angle δ sought by the steering command 120. Notably, the distance to the coupler 14 may still be great enough that vehicle 12 can move hitch ball 34 laterally to reach the correct coupler 14 location 28 with a slower change in steering angle δ and without exceeding a designated maximum steering angle $δ_{max}$. Similarly, if an update to the tracked coupler 14 location 28 leads to an abrupt change in the longitudinal positioning with respect to vehicle 12, abrupt longitudinal control changes, such as abrupt acceleration (by way of powertrain control signal 172) or braking (by way of brake control signal 170) that is not necessary to achieve proper alignment between hitch ball 34 and coupler 14. Similarly, smaller, but frequent changes in the determined location 28 of the coupler (even when coupler 14 is correctly identified) can result in smaller, but more rapid (i.e., fluttering) braking, acceleration, or steering commands.

Because drivers may prefer smoother operation of both the steering (particularly in implementations where the steering wheel 77 is coupled with the steered wheels 76 during system operation) and acceleration/braking, the present system 10 processes at least one of the steering control signal 120, powertrain control signal 172, and brake control signal to reduce abrupt changes in the vehicle speed or a position of the steering wheel 77 based on a change in the determined position 28 of the coupler 14. In one aspect, as discussed with respect to FIGS. 7-10, the steering rate is limited to a variable amount that, when acceptable, reduces the speed at which controller 26 attempts to change the steering angle δ to rate that is more acceptable to a user, while maintaining the ability of vehicle 12 to laterally align the hitch ball 34 with the coupler 14. Notably, at shorter distances $D_c$ between vehicle 12 and coupler 14, abrupt steering changes may be needed (and may be more acceptable to the user) to achieve proper alignment. Accordingly, determining the balance between driver comfort and system 10 accuracy is requires calculations across a number of considerations.

In one aspect, a preset maximum rate limit is established at the maximum rate of change in steering angle δ allowed under all conditions. This is implemented to prevent steering wheel 77 from moving at a speed that would generally be considered excessive. The rate is a fixed value that may be set/calibrated for the characteristics of vehicle 12 and the various system 10 components. Notably, the vehicle is at standstill during the initial launch sequence, and also at the end of the maneuver when the steering angle may be returned to center. When vehicle 12 is maneuvering by controller 26 executing operating routine 68, additional considerations are made for determining the upper boundary for the steering rate $\dot{δ}$ (i.e. the rate limit). The value is a balance between being able to complete a steering angle δ change to maintain vehicle 12 as close to the determined path 32 as possible, with driver psychological comfort. The steering rate $\dot{δ}$ may be limited to a range above and below its expected value. This limiting provides a measure of filtering, to smooth the performance of executing a steering angle δ change. This aspect of the rate limiting function is calculated by determining a future desired steering angle δ based on the current projected path 32, in comparison to the current steering angle δ. The expected steering rate $\dot{δ}$ is then calculated from these values. The system 10 produces a buffer above and below the expected rate $\dot{δ}$, to limit the steering rate $\dot{δ}$ to within this range. This calculation is based on the desired path 32, and is derived from the control law used to determine the steering angle δ required to achieve that desired path 32.

Figure 7:
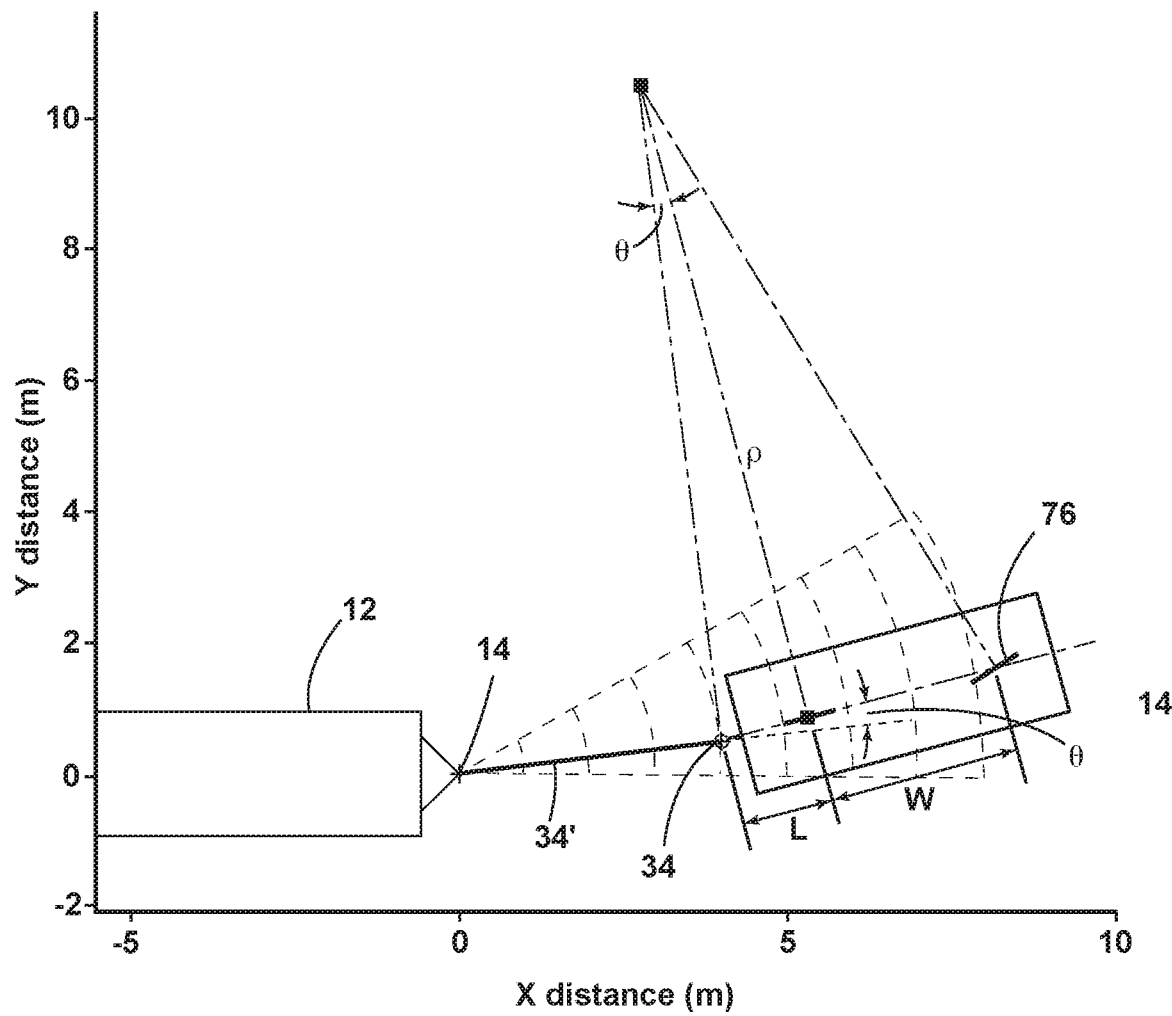
FIG. 7 is a schematic depiction of a simplified kinematic model used to apply one aspect of a rate limiting operation to a steering signal produced by the system according to an aspect of the disclosure.
Figure 8:
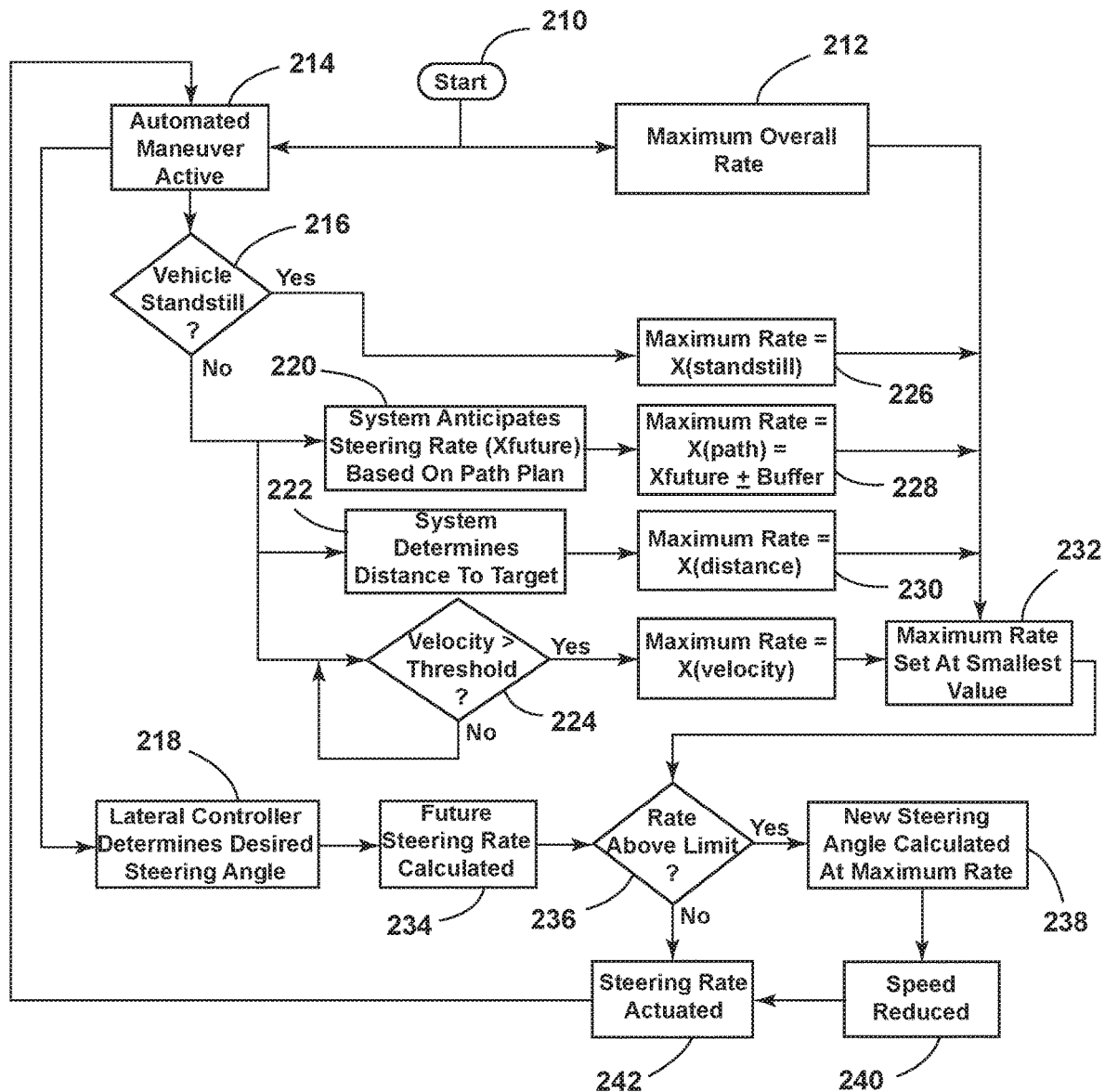
FIG. 8 is a flowchart depicting logic or method steps for applying a rate limit operation to the steering signal.

In one implementation, the path derivation routine 66 (described further in U.S. Pat. No. 10,427,716, the entire disclosure of which is hereby incorporated by reference herein) employs a technique where the path 32 is derived with the goal that hitch ball 34 travels along a straight path 34' from its current position to the target position, as shown in FIG. 7 (the actual path 32 taken, may vary due to the orientation of vehicle 12 relative to trailer and the initial position of the steered wheels 76, for example). By simplifying the kinematic vehicle model from FIG. 3 such that the vehicle 12 is assumed to have only two wheels (one steered), the following equation is derived that finds the required steered wheel 76 angle δ to follow the desired hitch ball path 34', based on the angle θ between the path 34' and the longitudinal axis 13 of vehicle 12:

$$δ = \tan^{-1} \frac{WB \cdot \tan(θ)}{L}, \qquad (3)$$

where:
δ is the front road wheel angle;
WB is the vehicle wheelbase; and
L is the distance between the center of the rear axle and the hitch ball.

Assuming perfect sensing of steering angle δ and instantaneous steering angle change, the steering command 120 rate of change $\dot{δ}$ is the derivative of equation (3).

$$\dot{δ} = \frac{d}{dθ}δ = \frac{1}{1 + \left(\frac{WB \cdot \tanθ}{L}\right)^2} \cdot \frac{WB}{L} \cdot \sec^2θ \cdot \dot{θ}, \qquad (4)$$

which can be simplified to:

$$\dot{δ} = \frac{WB \cdot L}{L^2 \cdot \cos^2θ + WB^2 \cdot \sin^2θ} \cdot \dot{θ}. \qquad (5)$$

Assuming the target position does not move, it is known that:

$$\dot{θ} = ω = \frac{v_x}{WB} \cdot \tanδ, \qquad (6)$$

where:
ω is the vehicle yaw rate.
By substituting (6) into (5) for $\dot{θ}$, the equation becomes:

$$\dot{δ} = \frac{L}{L^2 \cdot \cos^2θ + WB^2 \cdot \sin^2θ} \cdot v_x \cdot \tan δ_{act}, \qquad (7)$$

where:
$δ_{act}$ is the current road wheel angle;
and $v_x$ is the current vehicle speed.
Equation (7) relates the anticipated rate of change $\dot{δ}$ of the steering command 120 to the current vehicle 12 speed and steering wheel 77 angle. To account for sensing uncertainty, $δ_{act}$ in (7) can be replaced with:

$$\max(|δ_{cmd_{ulim}}|, |δ_{act}|, |δ_{cmd_{ulim}} - δ_{act}|), \text{ where:} \qquad (8)$$

$\delta_{cmd_{ulim}}$ is the current unlimited commanded road wheel angle.

Additionally, two calibratable components can be added to equation (7) to achieve the desired steering performance, based on the particular sensing and actuation capabilities of steering system 10, resulting in the equation:

$$\dot{\delta} = \frac{L}{L^2 \cdot \cos^2\theta + WB^2 \cdot \sin^2\theta} \cdot v_x \cdot \tan(\max(|\delta_{cmd_{ulim}}|, |\delta_{act}|, |\delta_{cmd_{ulim}} - \delta_{act}|)) * k_{scale} + c_{offset}, \quad (9)$$

where:
$k_{scale}$ is a scaling factor; and
$c_{offset}$ is an offset factor.

Equation (9) can be further simplified where L<WB, resulting in:

$$\dot{\delta} \leq \frac{L}{L^2 \cdot \cos^2\theta + L^2 \cdot \sin^2\theta} \cdot v_x \cdot \tan(\max(|\delta_{cmd_{ulim}}|, |\delta_{act}|, |\delta_{cmd_{ulim}} - \delta_{act}|)) * k_{scale} + c_{offset}, \quad (10)$$

which further simplifies to:

$$\dot{\delta} \leq \frac{1}{L} \cdot v_x \cdot \tan(\max(|\delta_{cmd_{ulim}}|, |\delta_{act}|, |\delta_{cmd_{ulim}} - \delta_{act}|)) * k_{scale} + c_{offset}. \quad (11)$$

The steered wheel angle δ rate of change $\dot{\delta}$ can then be converted to a steering wheel 77 angle rate of change $S\dot{W}A$ using the vehicle's steering ratio, $k_{steer}$:

$$S\dot{W}A = \dot{\delta} \cdot k_{steer}. \quad (12)$$

Any combination of these approaches can be used to determine a final desired, maximum rate limit on the steering command, $S\dot{W}A_{max}$. This desired maximum rate limit can be compared to the actual rate of change of the steering command, which is calculated using the equation:

$$S\dot{W}A_{ulim} = \frac{SWA_{cmd_{ulim}} - SWA_{cmd_{prev}}}{\Delta t}, \quad (13)$$

where:
$SWA_{cmd_{prev}}$ is the previous time step commanded steering wheel angle;
$SWA_{cmd_{ulim}}$ is the current commanded steering wheel angle from the lateral control law; and
$\Delta t$ is a time step between the previous command and the current command.

Figure 9:
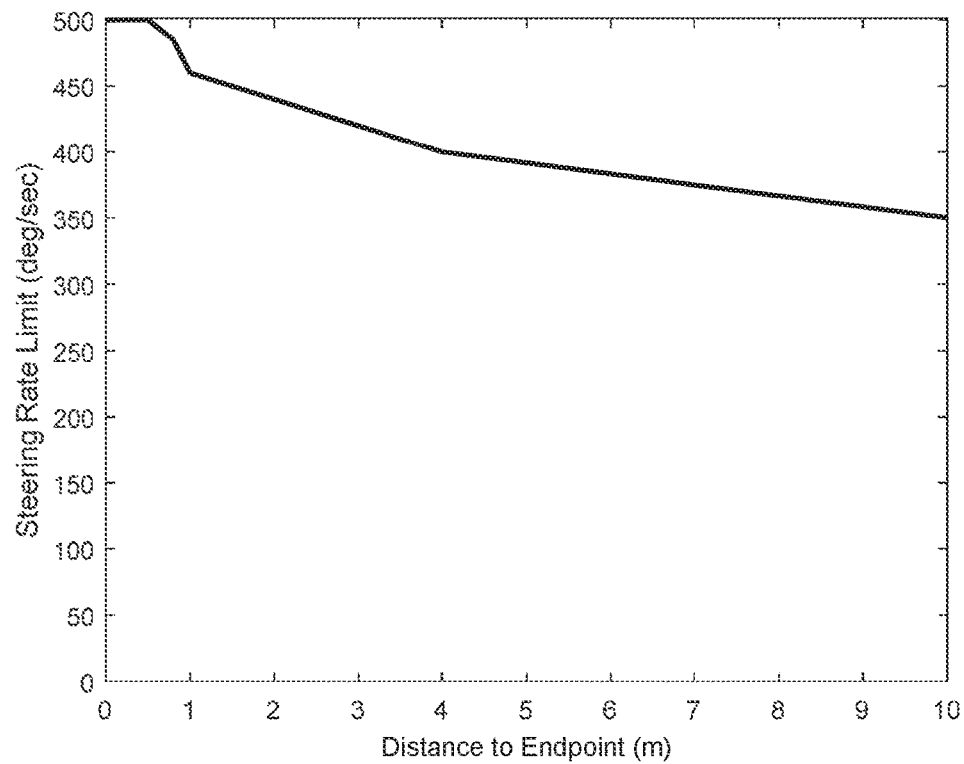
FIG. 9 is a graph depicting one calibration scheme for a distance-based rate limiting operation.

The resulting determination of the maximum rate limit on the steering command can, thusly, be set out according to the logic:

if $|S\dot{W}A_{ulim}| \leq S\dot{W}A_{max}$ $SWA_{cmd} = SWA_{cmd_{ulim}}$ elseif $S\dot{W}A_{ulim} > S\dot{W}A_{max}$ $SWA_{cmd} = SWA_{cmd_{prev}} + \Delta t \cdot S\dot{W}A_{max}$ elseif $S\dot{W}A_{ulim} < -S\dot{W}A_{max}$ $SWA_{cmd} = SWA_{cmd_{prev}} - \Delta t \cdot S\dot{W}A_{max}. \quad (14)$ The steering rate $\dot{\delta}$ can also be limited based on the remaining distance $D_c$ from the vehicle to the coupler 14. At relatively far distances, the maximum rate limit is lowered due to expected large noise in trailer 16 and/or coupler 14 perception tracking, and also because, as discussed above, there is still opportunity for recovery from a difference in an updated path 32 due to resolution in inaccuracies along the large remaining travel distance $D_c$. This allows for smooth control of steering system 20 that is pleasing to the driver to takes priority over exact following of path 32. Toward the end of the maneuver (e.g. at low distance $D_c$, including less than 1 m), the rate limit is raised to allow for higher accuracy of aligning to the final position 35. At such low distances, a small variation in the perceived coupler position 28 may lead to large change in steering angle δ that should be allowed in order to achieve desired alignment of the hitch ball 34 with the coupler 14. This distance-dependent rate limiting approach may be implemented using a one-dimension look-up table with values selected or calibrated based on system 10 and vehicle 12 characteristics. As shown in the example of FIG. 9, a desired maximum rate limit is found based on the distance $D_c$ between the hitch ball 34 and estimated coupler 14 position 28, as determined by the controller 26 using the image processing routine 64 on image data 55.

Figure 10:
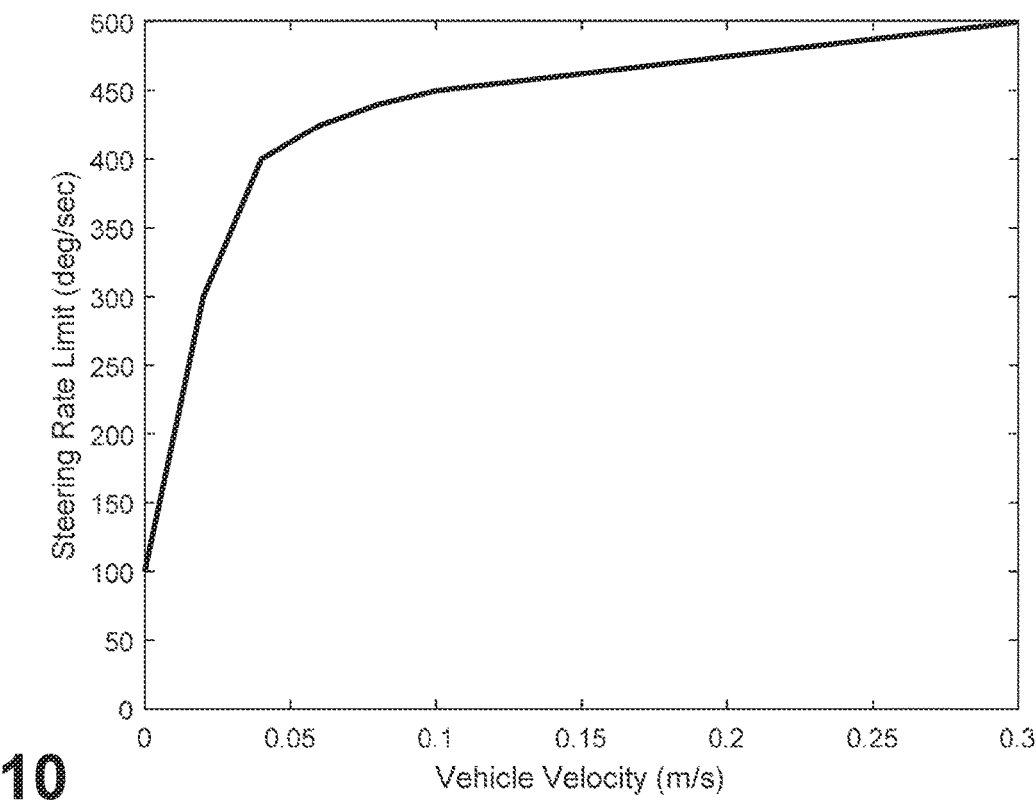
FIG. 10 is a graph depicting one calibration scheme for a velocity-based rate limiting operation.

In a similar manner, as shown in the example of FIG. 10, the steering rate $\dot{\delta}$ is also limited based on the vehicle 12 speed (as obtained from speed sensor 56). According to this scheme, at higher speeds, the rate limit is increased to prevent divergence from the planned path 32. This approach may also be implemented using a one-dimension look-up table with values selected or calibrated based on system 10 and vehicle 12 characteristics. Based on the current detected vehicle speed, a desired maximum rate limit is found.

The above discusses four processes to determine the rate limit applied to the steering rate $\dot{\delta}$. As further illustrated in the flowchart of FIG. 8, an implementation of system 10 can execute all of the described processes concurrently, with controller 26 selecting the lowest of the various determined rate limit values as the implemented rate limit actually applied to the steering rate $\dot{\delta}$. In particular, when system 10 is initiated (step 210), the preset maximum rate is established (step 212), as no other rates are calculated. When system 10 begins an automated backing maneuver, (step 214), the controller 26 determines (using speed sensor 56) whether vehicle 12 is moving or is at a standstill (step 216). While at a standstill, the above-mentioned maximum rate is still employed, which may apply as controller 26 adjusts the steering angle δ according to an initial steering command 120 derived based on the initial path planning (step 218) using path derivation and operating routines 66,68. When vehicle begins moving, the system simultaneously calculates the expected steering rate (step 220) according to equation (7), the distance $D_c$ to the detected coupler position 28 (step 222), and compares the vehicle speed from sensor 56 to, for example a threshold value (step 224). Controller 26 continues to simultaneously derive the respective rate limits associated with the results in steps 220, 222, and 224 to derive the anticipated steering rate limit (step 226), the distance-based rate limit (step 228), and the speed-based rate limit (step 230). The controller 26 then selects the lowest rate limit of the results obtained in steps 226, 228, and 230 and sets that as the system 10 rate limit (step 232). Independent from (and further simultaneous with) the various rate limit calculations, controller 26 determines the steering angle δ needed to maintain vehicle 12 on the planned path 32 (step 234). This desired steering angle δ is then compared to the existing steering angle $\delta_{act}$ to calculate the desired steering rate $\dot{\delta}$ (step 236). If the steering rate $\dot{\delta}$ is above the maximum value set in step 232 (step 238), then it is not actually commanded by controller 26, with controller 26 modifying the steering angle $\delta$ to a value that is closer to the current value $\delta_{act}$, in order to achieve a rate below the limit (step 240). If the calculated steering rate $\dot{\delta}$ is below the limit, the calculated steering angle $\delta$ is commanded in the steering command 120 (step 242). It is noted that, by modifying the desired steering angle $\delta$ in step 240, the system 10 will be unable to stay on the planned path 32. Accordingly, in a further aspect, controller 26 can lowers the commanded speed (by lowering powertrain control signal 172 and/or increasing the brake control signal 170) to compensate.

Figure 11:
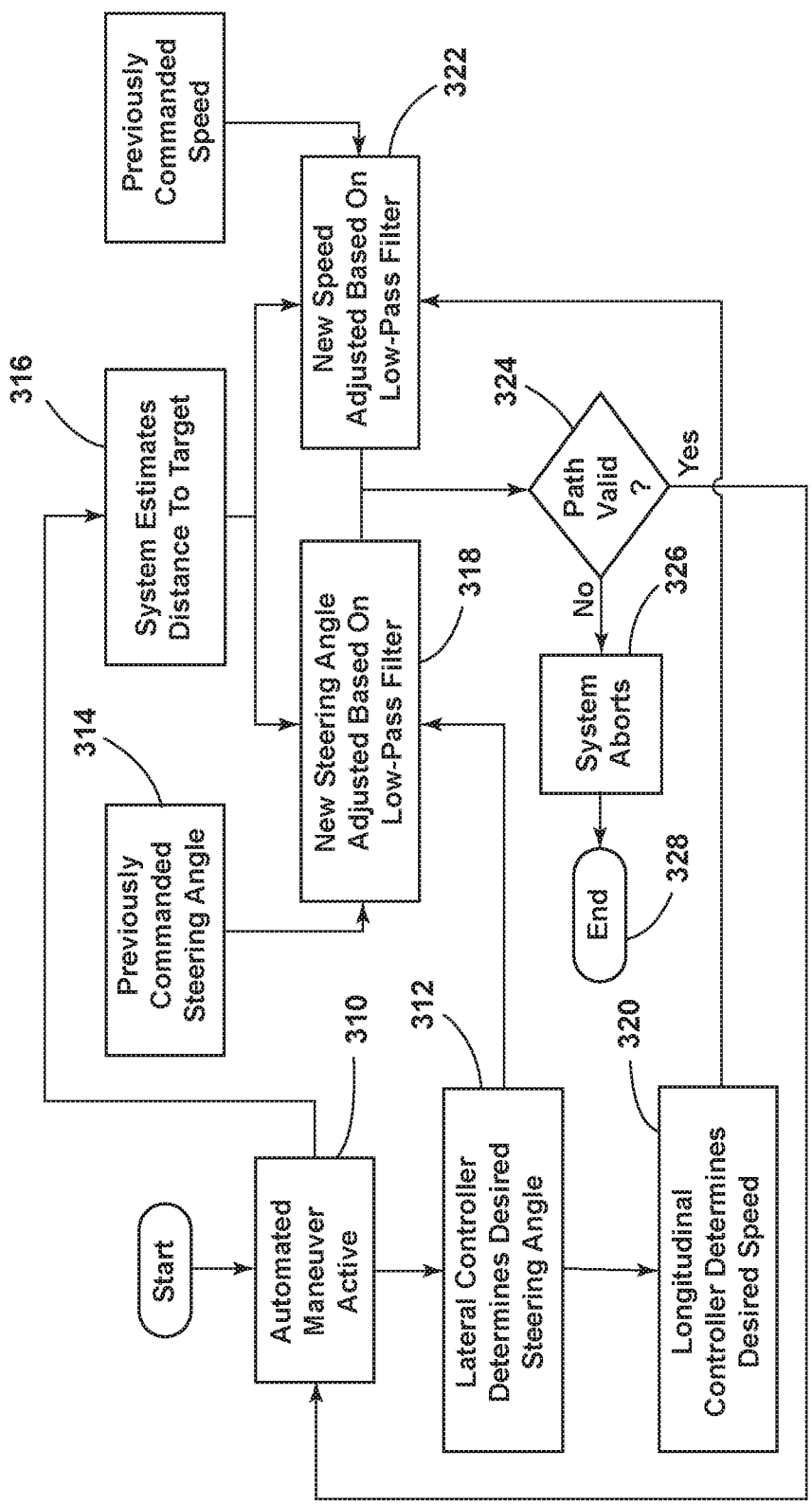
FIG. 11 is a flowchart depicting logic or method steps for applying a filtering operation to the steering signal and a longitudinal vehicle control according to another aspect of the disclosure.

Turning now to FIG. 11, the above-described processing of the steering, powertrain, and braking control signals 120, 172, and 170 can include (in addition to or substitution for the rate-limit processing described above), filtering based on the distance $D_c$ between the vehicle 12 and the coupler 14. As discussed above, during an automated backing maneuver according to operating routine 68, the vehicle 12 controls are prone to abrupt and rapid steering changes (fluttering), and abrupt acceleration and/or braking, as the control systems (20, 70, and 72) attempt to maneuver towards real-time coordinates provided by the noisy output of image processing and path derivation routines 64 and 66. The above-mentioned filtering of the steering 120 and speed commands (powertrain control signal 172 and brake control signal 170) is, accordingly, implemented to prevent flutter or jerk, but is adjusted to maintain the accuracy of the final alignment of hitch ball 34 with coupler 14. The amount of filtering varies dynamically during the automated backing maneuver, based on the current distance $D_c$ to the coupler 14 or trailer 16 (depending on the current system 10 state, for example).

In particular, in the illustrated example, the user of filtering of the various control signals 120, 170, and 172 allows for direct calibration of system 10 performance, while allowing the image processing and path derivation routines 64 and 66 to provide non-filtered or minimally-filtered coordinates for the coupler location 28 and path 32 endpoint 35. This lack of perception filtering allows the coordinates to be interpreted by down-stream receiving functions. For example, a down-stream function may be provided to assess the noisiness of the incoming coupler location 28 coordinates such that controller 26 can decide to abort the operation if the coordinates change or exhibit noisiness (or uncertainty) above a threshold (step 324). In general, the controller 26 reduces the amount of filtering near the end of the maneuver (i.e., at low distances Dc to coupler 14, such as less than 1 m), to increase the accuracy of the controls (which becomes a higher priority than driver comfort at such distances). In this respect, if large changes in steering angle $\delta$ are required near the end of the maneuver, the controls are not filtered to allow such changes to be made quickly. Early in the maneuver such changes have a reduced effect on final alignment that is removed as the maneuver continues.

The present solution is implemented during the automated backing of vehicle by execution of operating routine 68, as shown in step 310. The controller 26 uses the above-describe lateral control component to determine the desired steering angle $\delta$ based on derived path 32 (step 312) without filtering. Similarly, the desired vehicle 12 speed is calculated according to a speed profile, as a function of distance $D_c$ from the trailer 16 or coupler 14, as well as considerations for steering changes (step 314). In order to achieve filtering, various parameters are first needed. In one aspect, the steering command 120 is filtered using a simple low pass filter, which is realized using the following equation:

$$u_{flt} = y_t\left(1 - \frac{\tau}{1+\tau}\right) + y_{t-1}\left(\frac{\tau}{1+\tau}\right), \quad (14)$$

where
$y_t$ is the current desired steering command;
$y_{t-1}$ is the previous time step steering command; and
$\tau$ is the time constant of the filter.

The present filtering approach uses the time constant, $\tau$, which is a function of the current distance between the hitch ball 34 and the derived coupler position 28. As mentioned previously, when the vehicle 12 is far away from the coupler 14, following the commanded steering angle $\delta$ precisely is given a lower priority. Also, the estimated coupler position 28 is less accurate and more prone to sudden changes at greater distances. This means that system 10 can prioritize a smooth steering response over accuracy in following path 32 by increasing the filtering of the steering command 120. This is done by increasing the time constant, $\tau$. Accordingly, in step 316, the distance $D_c$ to the coupler 14 is determined, with the value being fed to the filter for application to the steering command 120 (step 318). In particular, when the vehicle 12 is close to the detected coupler position 28, precisely implementing the commanded steering angle $\delta$ allows system 10 to achieve better final alignment of the hitch ball 34 and coupler 14. Accordingly, at lower distances $D_c$, $\tau$ is reduced, leading to minimal filtering of the steering command 120 to accomplish improved alignment.

The commanded speed is also filtered (e.g, by filtering both the powertrain control and brake control commands 172 and 170) in a similar way as the steering control command 120. More specifically, the longitudinal component of operating routine 68 determines the desired vehicle speed (step 320). Another low-pass filter with a dependence on the distance to the trailer is applied to the commanded speed (which controller may then parse into the needed braking and powertrain commands 170 and 172) in step 322. Due to the filtering, the system may have been unable to achieve the proper ability to follow the path. This may result in the trailer entering an "invalid zone", which is unreachable by the vehicle 12, as determined in step 324. The system aborts if the path is no longer valid (step 326). Otherwise, maneuvering continues until the operation is complete (step 328).

Figure 12:
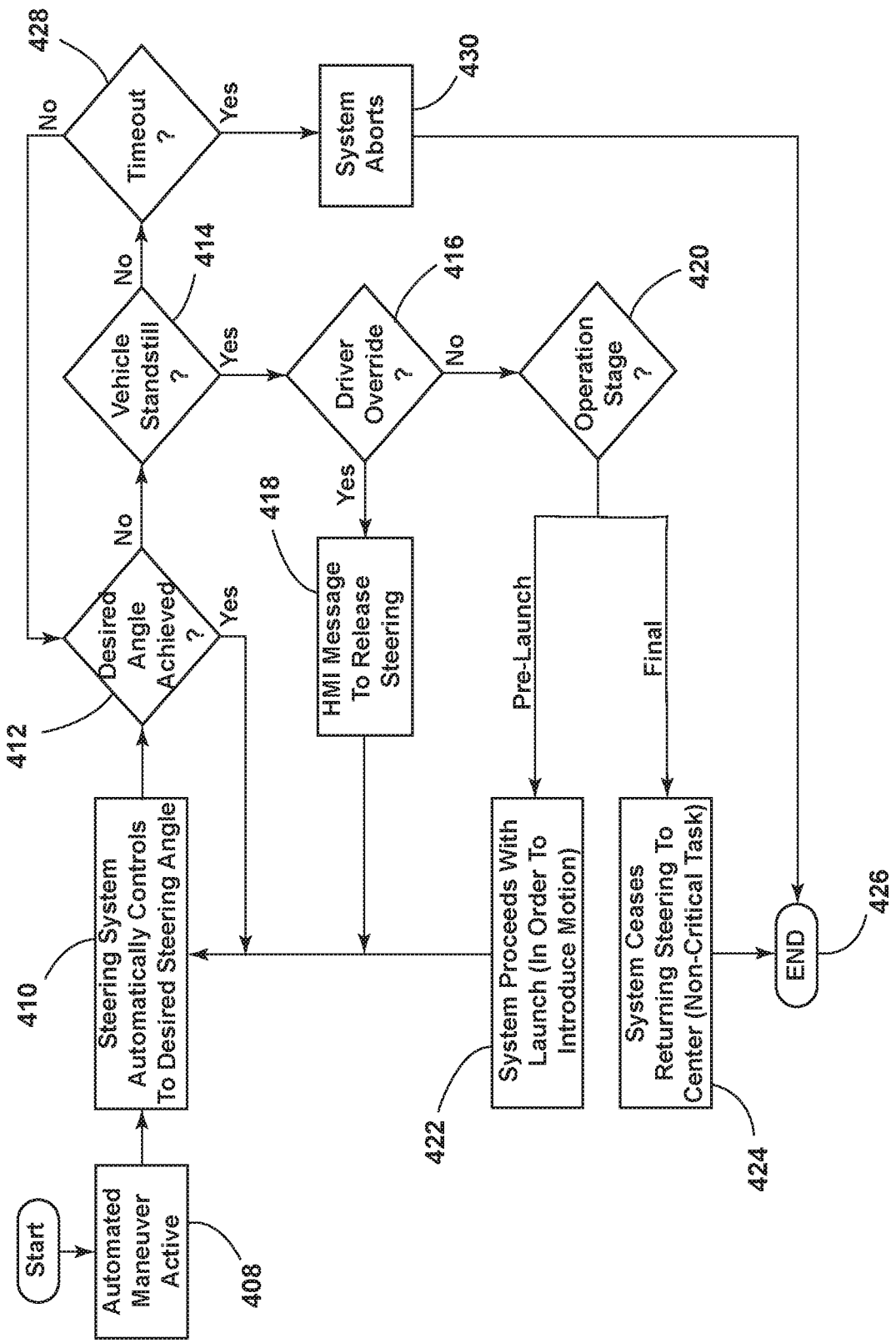
FIG. 12 is a flowchart depicting logic or method steps for processing a steering control signal to monitor and respond to a potential steering fault according to another aspect of the disclosure.
Figure 13:
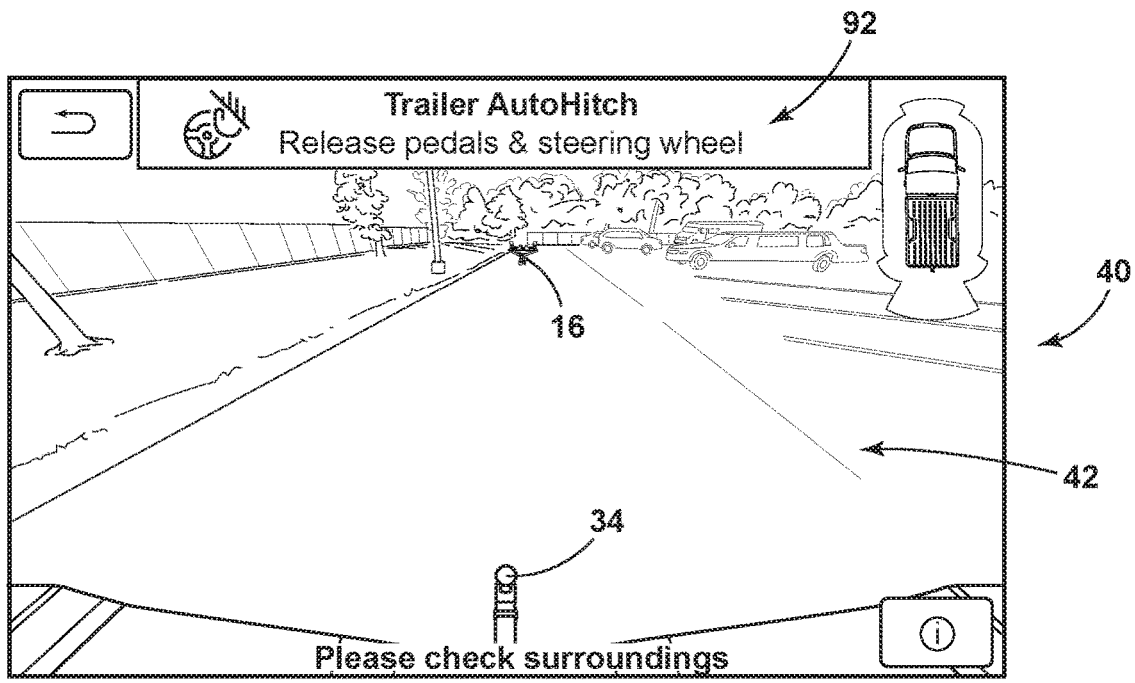
FIG. 13 is a depiction of a message, presentable by the vehicle to a user including instructions to release a vehicle steering wheel.
Figure 14:
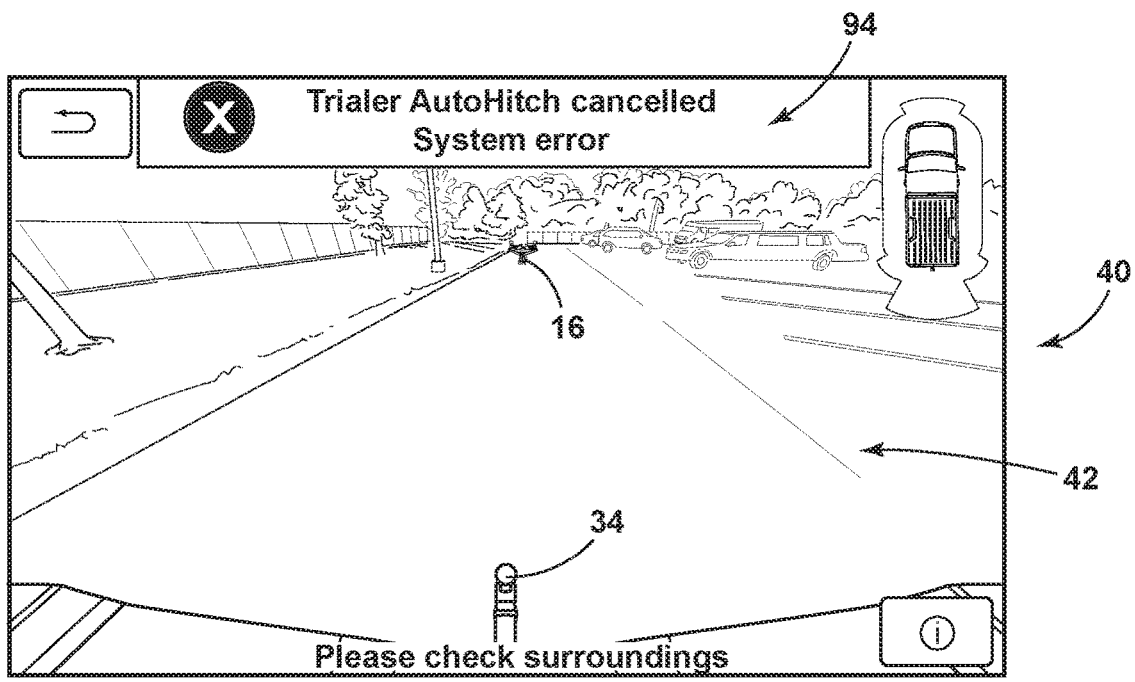
FIG. 14 is a depiction of a message, presentable by the vehicle to the user including a notification of a backing maneuver abort condition due to a steering fault.

Turning now to FIGS. 12-14, during an automated backing maneuver of vehicle 12 under control of system 10, the steering system 20 may become unresponsive for a number of reasons. In certain situations, an unresponsive steering system (determined, for example, by the steering angle $\delta$ not changing in spite of a command 120 to do so), is classified as a steering system 20 error, which leads to an abort of the maneuver. As a further aspect of the present system 10, certain steering actuation "errors" may be ignored by controller 26 during vehicle 12 standstill. Notably, while most steering system 20 errors occur during standstill, because the distance $D_c$ to the coupler 14 is static, the inability to change the steering angle $\delta$ does not immediately affect the lateral control of vehicle 12. If vehicle 12 is moved by controller 26, the steered wheels 76 may move easier or otherwise move into a position where movement is possible at a distance $D_c$ where path 32 updating can result in the coupler 14 still being laterally reachable by hitch ball in the remaining path 32 distance $D_c$. Accordingly, further processing of the steering control command 120 can include monitoring the current steered wheel angle $\delta_{act}$ for a change in response to the steering control signal 120 and determining a steering fault based on the current steered wheel position remaining stationary $\delta_{act}$ and the steering control signal 120 corresponding with steered wheel 76 movement for a predetermined time interval. Controller 26 can, accordingly, stop maneuvering the vehicle 12 when a steering fault is determined during movement of the vehicle 12, but can and ignore the steering fault when the vehicle is at a standstill.

As shown in FIG. 12, steering command faults during standstill can be handled via a timeout strategy, after which the system proceeds instead of aborting. In particular, upon system 10 activation (step 408) controller 26 can attempt to change the steering angle δ, as determined by operating routine 68 (step 410). Controller 10 continuously monitors the position of the steered wheels 76 using steering angle sensor 78 to determine if the commanded steering angle δ has been reached (step 412). Until the actual steering angle $\delta_{act}$ reaches the commanded steering angle δ, system simultaneously monitors system 10 to determine whether the vehicle is moving or is at a standstill (step 414). This monitoring can be conducted in a number of ways. In one aspect, controller 26 can make this determination based on the longitudinal control component of operating routine 68 such that, when the longitudinal control is for zero velocity or standstill (generally corresponding with a maximum braking command 170 and zero powertrain control command 172), an actual standstill condition is assumed. Conversely, if operating routine 68 is commanding a nonzero longitudinal component, controller 26 can assume that vehicle 12 is moving. Additionally or alternatively, controller 26 can monitor vehicle speed sensor 56 and/or wheel rotation sensors 100 to determine whether vehicle 12 is moving or is at a standstill.

If, in step 414, vehicle is determined to be at a standstill, controller assesses the steered wheel condition 76 to determine the potential fault. In one aspect, controller 26 monitors the torque sensor 80 to determine if a torque is present on steering wheel 77 (step 416). The application of torque on the steering wheel can be assumed to be caused by the user maintaining a grasp on the steering wheel 77, as they may not yet be ready for or expecting autonomous steering (such as during system initiation, where a driver may unfamiliar with system 10 operation may not be prepared for vehicle 12 to steer autonomously before moving). If steering wheel 77 torque is detected, system presents a message, via HMI 40 (step 418), to instruct the user to release the steering wheel, an example of which is shown in FIG. 13. This can include before controller 26 commands movement of vehicle. If there is no torque present on steering wheel 77, controller assesses the operational stage of system 10 (step 420). In particular, controller 26 takes into consideration whether the automated hitching maneuver is at an initial standstill condition (i.e. before controller 26 commands any longitudinal movement). If system 10 is at the initial standstill condition, then controller 26 proceeds with the backing maneuver (essentially, temporarily ignoring the potential fault condition), resulting in operating routine commanding longitudinal vehicle 12 movement (step 422), which may allow the steering angle δ to change simply by wheel rotation and/or by moving to a more solid grounds surface or out of engagement with a potential obstruction. If the operational stage of system 10, in step 420, is determined to be at a final standstill (i.e., when the operating routine 68 longitudinal control has stopped vehicle 12 at the endpoint 35 of path 32), the steering command is determined to be a return-to-center command, wherein system 10 attempts to return the steering to 0° at the end of the maneuver. Because this steering command is designated as non-essential (vehicle 12 operation by the user may resume with the steering at a non-zero angle), controller 26 simply skips returning the steered wheels 76 to center (step 424) and allows the maneuver to end (step 426), as otherwise planned.

During vehicle movement, which can include after moving vehicle in step 416 in response to a potential steering fault during initial vehicle 12 standstill, or during ordinary backing during execution of operating routine 68, controller applies a timeout operation (step 428) during attempted steering angle δ changes. To that end, when controller 26 is commanding a change in steering angle δ while vehicle is moving (i.e., not at standstill in step 414), controller 26 begins a timer that runs as controller 26 commands a steering angle δ that has not yet been reached by steered wheels 76. If the desired angle is not achieved before a designated timeout interval, a fault is determined and system 10 aborts the maneuver (step 430), including notifying the user via a message 94 presented on HMI 40 (FIG. 14), when then ends (step 426). If the desired steering angle δ is reached before the timeout (step 414), the maneuver continues, with controller 26 continuing to command the steering angle δ called for by the lateral component of operating routine 68 until vehicle 12 reaches the endpoint 35 of path 32. In this respect, the timeout interval can be calibrated based on the configuration and responsiveness of steering motor 74 and of steering system 20 overall. Further, the timeout interval can also take into account (either by consideration in setting a predetermined, static limit or by dynamically adjusting) the rate limiting of the steering control command 120 discussed above with respect to FIGS. 7-10.

System can use any of the solutions described individually, or in various combinations. In this respect, the steering command 120 fault processing can be used alone in an implementation or system 10 without the above-described rate limiting (FIGS. 7-10) or signal filtering (FIG. 11). Still Further, a system 10 can be implemented with steering system 20 response configured to prioritize driver comfort, when possible, by using either rate limiting or filtering or by using rate limiting and filtering. Still further, steering system 20 response can be smoothed using rate limiting, with filtering being applied to the brake and powertrain control signals 170 and 172. As can be appreciated, further combinations and configurations are possible.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
   a vehicle steering system;
   a vehicle powertrain control system;
   a vehicle brake system;
   a vehicle speed sensor;
   a detection system outputting a signal including scene data of an area to a rear of the vehicle; and
   a controller:
      receiving the scene data and identifying the trailer within the area to the rear of the vehicle;
      deriving a backing path to align a hitch ball mounted on the vehicle to a coupler of the trailer; and
      deriving a steering control signal, a powertrain control signal, and a brake control signal to respectively control the vehicle steering system, the vehicle powertrain control system, and the vehicle brake system to maneuver the vehicle, including reversing along the backing path, wherein the controller processes at least one of the steering control signal, powertrain control signal, and brake control signal according to one of a distance to the coupler derived from the scene data or a vehicle speed obtained from the vehicle speed sensor to allow increasingly more abrupt vehicle movement with one of a decreasing distance to the coupler or a decreasing vehicle speed.

2. The system of claim 1, wherein the controller processes the steering control signal by applying a rate limit to the steering control signal, the rate limit varying with at least one of the distance to the coupler or the vehicle speed.

3. The system of claim 2, wherein the controller determines the rate limit by:
   deriving a first rate limit based on the vehicle speed;
   deriving a second rate limit based on the distance to the coupler;
   deriving a third rate limit based on an expected steering control signal based on the path; and
   selecting a lowest rate limit among the first rate limit, the second rate limit, and the third rate limit.

4. The system of claim 3, wherein:
   the controller determines the rate limit by selecting the lowest rate limit among the first rate limit, the second rate limit, and the third rate limit when the vehicle is determined to be moving; and
   the controller applies a preset maximum rate when the vehicle is determined to be at a standstill.

5. The system of claim 2, wherein the controller processes the steering control signal by applying the rate limit to the steering control signal such that the rate limit varies with the distance to the coupler by increasing the rate limit with a decreasing distance to the coupler.

6. The system of claim 2, wherein the controller processes the steering control signal by applying the rate limit to the steering control signal such that the rate limit varies with the vehicle speed by decreasing the rate limit with a decreasing vehicle speed.

7. The system of claim 1, wherein the controller processes the at least one of the steering control signal, powertrain control signal, and brake control signal by applying a filter to the at least one of the steering control signal, powertrain control signal, and brake control signal, the filter being applied with a gain that decreases with a decreasing distance to the coupler.

8. The system of claim 1, wherein the controller:
   processes the steering control signal by monitoring a current steered wheel position for a change in response to the steering control signal and determining a steering fault based on the current steered wheel position remaining stationary and the steering control signal corresponding with steered wheel movement for a predetermined time interval;
   stops maneuvering the vehicle when the steering fault is determined during movement of the vehicle; and
   ignores the steering fault when the vehicle is at a standstill.

9. The system of claim 1, wherein the controller:
   processes the scene data to determine a position of the coupler relative to the vehicle on an ongoing basis while reversing along the backing path, at least within a predetermined distance of the trailer;
   continuously derives the backing path based on the determined position of the coupler;
   continuously derives the steering control signal, a powertrain control signal, and a brake control signal to maintain the vehicle along the backing path; and
   processes the at least one of the steering control signal, powertrain control signal, and brake control signal to reduce abrupt changes in the vehicle speed or a position of a steering wheel based on a change in the determined position of the coupler.

10. A system for assisting in aligning a vehicle for hitching with a trailer, comprising:
    a vehicle steering system;
    a vehicle brake system;
    a vehicle speed sensor;
    a detection system outputting a signal including scene data of an area to a rear of the vehicle; and
    a controller:
       receiving the scene data and identifying the trailer within the area to the rear of the vehicle;
       deriving a backing path to align a hitch ball mounted on the vehicle to a coupler of the trailer; and
       deriving a steering control signal to control the vehicle steering system to maneuver the vehicle, including reversing along the backing path, wherein the controller applies a rate limit to the steering control signal, the rate limit varying with at least one of a distance to the coupler derived from the scene data or a vehicle speed obtained from the vehicle speed sensor such that increasingly abrupt steering movement is allowed with one of a decreasing distance to the coupler or a decreasing vehicle speed.

11. The system of claim 10, wherein the controller determines the rate limit by:
deriving a first rate limit based on the vehicle speed;
deriving a second rate limit based on the distance to the coupler;
deriving a third rate limit based on an expected steering control signal based on the path; and
selecting a lowest rate limit among the first rate limit, the second rate limit, and the third rate limit.

12. The system of claim 11, wherein:
the controller determines the rate limit by selecting the lowest rate limit among the first rate limit, the second rate limit, and the third rate limit when the vehicle is determined to be moving; and
the controller applies a preset maximum rate when the vehicle is determined to be at a standstill.

13. The system of claim 10, wherein the controller processes the steering control signal by applying the rate limit to the steering control signal such that the rate limit varies with the distance to the coupler by increasing the rate limit with a decreasing distance to the coupler.

14. The system of claim 10, wherein the controller processes the steering control signal by applying the rate limit to the steering control signal such that the rate limit varies with the vehicle speed by decreasing the rate limit with a decreasing vehicle speed.

15. The system of claim 10, wherein the controller further:
monitors a current steered wheel position, received from the vehicle steering system, for a change in response to the steering control signal and determines a steering fault based on the current steered wheel position remaining stationary and the steering control signal corresponding with steered wheel movement for a predetermined time interval;
stops maneuvering the vehicle when the steering fault is determined during movement of the vehicle; and
ignores the steering fault when the vehicle is at a standstill.

16. A system for assisting in aligning a vehicle for hitching with a trailer, comprising:
a vehicle steering system;
a vehicle powertrain control system;
a vehicle brake system;
a detection system outputting a signal including scene data of an area to a rear of the vehicle; and
a controller:
receiving the scene data and identifying the trailer within the area to the rear of the vehicle;
deriving a backing path to align a hitch ball mounted on the vehicle to a coupler of the trailer; and
deriving a steering control signal, a powertrain control signal, and a brake control signal to respectively control the vehicle steering system, the vehicle powertrain control system, and the vehicle brake system to maneuver the vehicle, including reversing along the backing path, wherein the controller applies a filter to at least one of the steering control signal, powertrain control signal, and brake control signal, the filter varying according to a distance to the coupler derived from the scene data to allow increasingly more abrupt vehicle movement with one of a decreasing distance to the coupler or a decreasing vehicle speed.

17. The system of claim 16, wherein the filter is applied with a gain that decreases with a decreasing distance to the coupler.

18. The system of claim 16, wherein the controller:
processes the scene data to determine a position of the coupler relative to the vehicle on an ongoing basis while reversing along the backing path, at least within a predetermined distance of the trailer;
continuously derives the backing path based on the determined position of the coupler;
continuously derives the steering control signal, a powertrain control signal, and a brake control signal to maintain the vehicle along the backing path; and
applies the filter to the at least one of the steering control signal, powertrain control signal, and brake control signal to reduce abrupt changes in the vehicle speed or a position of a steering wheel based on a change in the determined position of the coupler.

19. The system of claim 16, further including a vehicle speed sensor, wherein:
the controller further applies a rate limit to the steering control signal, the rate limit varying with at least one of a distance to the coupler derived from the scene data or a vehicle speed obtained from the vehicle speed sensor.

20. The system of claim 16, further including a vehicle speed sensor, wherein the controller further:
monitors a current steered wheel position, received from the vehicle steering system, for a change in response to the steering control signal and determines a steering fault based on the current steered wheel position remaining stationary and the steering control signal corresponding with steered wheel movement for a predetermined time interval;
stops maneuvering the vehicle when the steering fault is determined during movement of the vehicle; and
ignores the steering fault when the vehicle is at a standstill.

* * * * *